United States Patent
Geml et al.

(10) Patent No.: US 10,289,544 B2
(45) Date of Patent: May 14, 2019

(54) MAPPING TABLES FOR STORAGE DEVICES

(71) Applicant: Western Digital Technologies, Inc., Irvine, CA (US)

(72) Inventors: Adam Christopher Geml, Rochester, MN (US); Colin Christopher McCambridge, Rochester, MN (US); Philip James Sanders, Rochester, MN (US); Lee Anton Sendelbach, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 175 days.

(21) Appl. No.: 15/214,345

(22) Filed: Jul. 19, 2016

(65) Prior Publication Data

US 2018/0024919 A1    Jan. 25, 2018

(51) Int. Cl.
*G06F 12/00* (2006.01)
*G06F 13/00* (2006.01)
(Continued)

(52) U.S. Cl.
CPC .......... *G06F 12/0246* (2013.01); *G06F 3/061* (2013.01); *G06F 3/0659* (2013.01);
(Continued)

(58) Field of Classification Search
CPC .... G06F 12/0246; G06F 3/061; G06F 3/0659; G06F 3/0665; G06F 3/0679; G06F 12/10;
(Continued)

(56) References Cited

U.S. PATENT DOCUMENTS

| 8,612,666 B2 | 12/2013 | Royer, Jr. et al. |
| 8,745,319 B2 | 6/2014 | Langlois et al. |

(Continued)

FOREIGN PATENT DOCUMENTS

| CN | 103425605 A | 12/2013 |
| CN | 103777905 A | 5/2014 |

OTHER PUBLICATIONS

Everspin ST-MRAM Incorporated for Cache Memory Into Buffalo Memory SSD, Nov. 18, 2013; Retrieved from https://www.everspin.com/sites/default/files/pressdocs/Buffalo_Memory_Release_111813.pdf, 2 pgs.

(Continued)

*Primary Examiner* — Sheng Jen Tsai
(74) *Attorney, Agent, or Firm* — Patterson & Sheridan, LLP; Steven Versteeg

(57) ABSTRACT

In some examples, a storage device includes a first non-volatile memory array configured to store data from a host device and the storage device and a second non-volatile memory array configured to store data from the storage device, wherein the second non-volatile memory array is separate from the first non-volatile memory array. The storage device also includes a controller configured to store a virtual-to-physical mapping table to the first non-volatile memory array and store a portion of the virtual-to-physical mapping table to the second non-volatile memory array.

20 Claims, 5 Drawing Sheets

(51) Int. Cl.
*G06F 12/02* (2006.01)
*G06F 3/06* (2006.01)
*G06F 12/10* (2016.01)

(52) U.S. Cl.
CPC .......... *G06F 3/0665* (2013.01); *G06F 3/0679* (2013.01); *G06F 12/10* (2013.01); *G06F 2212/1024* (2013.01); *G06F 2212/152* (2013.01); *G06F 2212/214* (2013.01); *G06F 2212/657* (2013.01); *G06F 2212/7201* (2013.01)

(58) Field of Classification Search
CPC ....... G06F 2212/1024; G06F 2212/152; G06F 2212/214; G06F 2212/657; G06F 2212/7201
USPC ......................................................... 711/103
See application file for complete search history.

(56) References Cited

U.S. PATENT DOCUMENTS

| | | | | |
|---|---|---|---|---|
| 8,793,429 | B1* | 7/2014 | Call | G06F 12/0246 711/103 |
| 8,966,205 | B1* | 2/2015 | Lo | G06F 12/0246 711/165 |
| 9,009,396 | B2* | 4/2015 | Nemazie | G06F 12/0246 707/639 |
| 9,507,639 | B2* | 11/2016 | Sela | G06F 9/5027 |
| 2006/0036897 | A1* | 2/2006 | Lin | G06F 11/1068 714/5.1 |
| 2006/0149902 | A1* | 7/2006 | Yun | G06F 12/0866 711/118 |
| 2009/0327601 | A1* | 12/2009 | Fienblit | G06F 11/2074 711/114 |
| 2010/0037001 | A1* | 2/2010 | Langlois | G06F 12/0246 711/103 |
| 2010/0088289 | A1* | 4/2010 | Zhu | G06F 17/30362 707/695 |
| 2010/0332730 | A1* | 12/2010 | Royer, Jr. | G06F 12/0246 711/103 |
| 2012/0079171 | A1* | 3/2012 | Ju | G06F 12/0246 711/103 |
| 2012/0137195 | A1* | 5/2012 | Bueb | G06F 11/1012 714/777 |
| 2013/0297880 | A1* | 11/2013 | Flynn | G06F 1/183 711/128 |
| 2013/0304978 | A1* | 11/2013 | Trika | G06F 12/0246 711/103 |
| 2013/0339576 | A1 | 12/2013 | Liu et al. | |
| 2014/0115315 | A1* | 4/2014 | Ratn | G06F 9/4401 713/2 |
| 2014/0122776 | A1* | 5/2014 | El Maghraoui | G06F 12/0246 711/103 |
| 2014/0143476 | A1* | 5/2014 | Sela | G06F 3/0619 711/103 |
| 2014/0149640 | A1* | 5/2014 | Burke | G06F 12/02 711/103 |
| 2014/0195725 | A1* | 7/2014 | Bennett | G06F 12/0246 711/103 |
| 2014/0215199 | A1* | 7/2014 | Ma | G06F 9/4406 713/2 |
| 2014/0229662 | A1* | 8/2014 | Yano | G06F 12/0246 711/103 |
| 2014/0281150 | A1* | 9/2014 | Kuo | G06F 12/0246 711/103 |
| 2015/0193302 | A1* | 7/2015 | Hyun | G11C 29/52 714/764 |
| 2016/0110111 | A1* | 4/2016 | Song | G06F 3/0607 711/103 |
| 2016/0274794 | A1* | 9/2016 | Yoon | G06F 3/064 |
| 2016/0371019 | A1* | 12/2016 | Kang | G06F 3/0616 |
| 2017/0075811 | A1* | 3/2017 | Hsu | G06F 12/0888 |
| 2017/0083372 | A1* | 3/2017 | Lin | G06F 9/5016 |
| 2017/0090815 | A1* | 3/2017 | Kelner | G06F 3/0619 |
| 2017/0139645 | A1* | 5/2017 | Byun | G06F 3/0619 |

OTHER PUBLICATIONS

Coughlin, "Emerging Solids State Storage and Higher Endurance Flash", Forbes/Tech, Aug. 17, 2014, Retrieved from http://www.forbes.com/sites/tomcoughlin/2014/08/17/emerging-solid-state-storage-and-higher-endurance-flash/, 4 pgs.

Xie et al., "ECAM: An Efficient Cache Management Strategy for Address Mappings in Flash Translation Layer", 10th International Symposium, APPT, Aug. 27-28, 2013, 5 pgs.

* cited by examiner

MAPPING TABLES FOR STORAGE DEVICES

TECHNICAL FIELD

This disclosure relates to mapping tables for storage devices and more specifically, virtual to physical ("V2P") mapping tables for storage devices.

BACKGROUND

A data storage device, such as a hard disk drive (HDD) or solid state drive (SSD), may maintain a virtual to physical (V2P) mapping table that maps physical block addresses (PBAs) assigned to the actual storage media to virtual block addresses (which may also be referred to as "logical block addresses" or "LBAs"). The data storage device may maintain the V2P mapping table so as to expose more static LBAs for use by an executing application or operating system. From the perspective of the executing application or operating system, the LBA assigned to data does not change (and hence is static). The data storage device may map the LBA to a PBA that changes during operation of the data storage device. SDDs may, for example, perform various types of maintenance (e.g., for purposes of wear leveling, garbage collection, etc.) that move data between PBAs. To account for the movement of data, the data storage device may change the association or mapping of the LBA to the new PBA.

The data storage device may store a copy of the V2P mapping table in a non-volatile memory array of the mass storage area of the data storage device for purposes of retention between power cycles. To enable more efficient access (in terms of access times), the data storage device may however load the V2P mapping table from the non-volatile memory to a volatile memory, such as dynamic random access memory ("DRAM").

SUMMARY

In some examples, the disclosure describes a storage device including a first non-volatile memory array configured to store data from a host device and the storage device and a second non-volatile memory array configured to store data from the storage device, where the second non-volatile memory array is separate from the first non-volatile memory array. The storage device also includes a controller configured to store a virtual-to-physical mapping table to the first non-volatile memory array and store a portion of the virtual-to-physical mapping table to the second non-volatile memory array.

In some examples, the disclosure describes a method including storing, by a controller of a storage device, a virtual-to-physical mapping table to a first non-volatile memory array configured to store data from a host device and the storage device. The method also includes storing, by the controller, a portion of the virtual-to-physical mapping table to a second non-volatile memory array configured to store data from the storage device, where the second non-volatile memory array is separate from the first non-volatile memory array.

In some examples, the disclosure describes a computer-readable storage device including instructions that, when executed, configure one or more processors of the storage device to store a virtual-to-physical mapping table to a first non-volatile memory array configured to store data from a host device and the storage device. The computer-readable storage device also includes instructions that, when executed, configure the one or more processors to store a portion of the virtual-to-physical mapping table to a second non-volatile memory array configured to store data from the storage device, where the second non-volatile memory array is separate from the first non-volatile memory array.

The details of one or more examples are set forth in the accompanying drawings and the description below. Other features, objects, and advantages will be apparent from the description and drawings, and from the claims.

DETAILED DESCRIPTION

A data storage device may include a virtual-to-physical (V2P) mapping table that associates the virtual addresses of data stored by a host device to physical addresses identifying locations in memory arrays. The data storage device may store the V2P mapping table in a mass storage area (which may represent a non-volatile memory array (NVMA) used to store data from both the storage device and the host device) of the data storage device so as to retain the V2P mapping table between power cycles. During the boot process, the data storage device may retrieve the V2P mapping table from the mass storage area, and store the V2P mapping table to a volatile memory to enable more efficient access (in terms of the access times) of the V2P mapping table.

The host device may however attempt to write or read data (by issuing write or read requests) prior to the data storage device having fully stored the V2P mapping table to the volatile memory. When the V2P mapping table is not yet accessible in the volatile memory, the data storage device may either defer processing the write or read requests until the V2P mapping table has been stored into the volatile memory or retrieve the entry of the V2P mapping table from the mass storage area, both of which may add latency in processing of the write or read requests.

In general, this disclosure describes techniques implemented by a controller in a data storage device configured to store a portion of a V2P mapping table to a non-volatile memory array that is separate from the mass storage area. The controller may access the portion of the V2P mapping table during a boot process to process write or read requests and thereby locate data while the data storage device constructs a complete version of the V2P mapping table (which may also be referred to as an "indirection system") in volatile memory.

Figure 1:
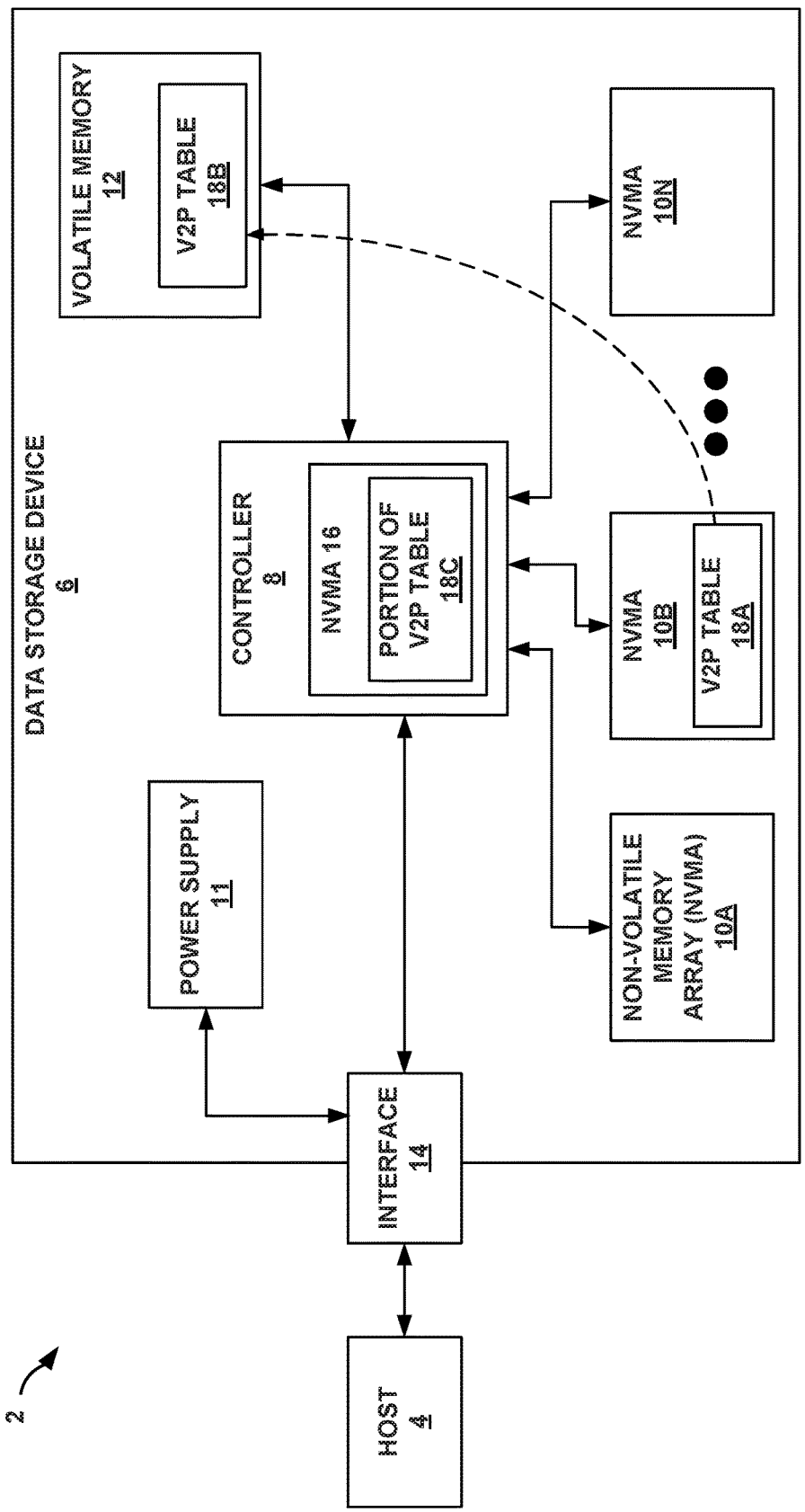
FIG. 1 is a conceptual block diagram illustrating an example storage environment in which a data storage device may store a virtual-to-physical (V2P) mapping table, in accordance with one or more techniques of this disclosure.

FIG. 1 is a conceptual block diagram illustrating an example storage environment 2 in which a data storage device 6 may store a V2P mapping table 18, in accordance with one or more techniques of this disclosure. For instance, host device 4 may utilize non-volatile memory devices included in data storage device 6 to store and retrieve data. In some examples, storage environment 2 may include a plurality of storage devices, such as data storage device 6, which may operate as a storage array. For instance, storage environment 2 may include a plurality of storages devices 6 configured as a redundant array of inexpensive/independent disks (RAID) that collectively function as a mass storage device for host device 4. Data storage device 6 may be, for example, a solid state drive (SSD), a hard disk drive (HDD), a hybrid drive, which includes both solid state memory and magnetic media, or the like.

Storage environment 2 may include host device 4 which may store and/or retrieve data to and/or from one or more storage devices, such as data storage device 6. As illustrated in FIG. 1, host device 4 may communicate with data storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, and the like. Typically, host device 4 comprises any device having a processor, which may refer to any form of hardware capable of processing data and may include a general purpose processing unit, such as a central processing unit (CPU), dedicated hardware (such as an application specific integrated circuit (ASIC)), configurable hardware such as a field programmable gate array (FPGA) or any other form of processing unit configured by way of software instructions, microcode, firmware or the like.

As illustrated in FIG. 1, data storage device 6 may include controller 8, non-volatile memory arrays 10A-10N (NVMAs 10), power supply 11, volatile memory 12, and interface 14. In some examples, data storage device 6 may include additional components not shown in FIG. 1 for sake of clarity. For example, data storage device 6 may include a printed circuit board (PCB) to which components of data storage device 6 are mechanically attached and which includes electrically conductive traces that electrically interconnect components of data storage device 6, or the like. In some examples, the physical dimensions and connector configurations of data storage device 6 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, data storage device 6 may be directly coupled (e.g., directly soldered) to a motherboard of host device 4.

Data storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), PCI-express, or Non-Volatile Memory Express (NVMe). The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit data storage device 6 to receive power from host device 4. For example, as illustrated in FIG. 1, power supply 11 may receive power from host device 4 via interface 14.

Data storage device 6 may include power supply 11, which may provide power to one or more components of data storage device 6. When operating in a standard mode, power supply 11 may provide power to the one or more components using power provided by an external device, such as host device 4. For instance, power supply 11 may provide power to the one or more components using power received from host device 4 via interface 14.

Some examples of the one or more power storage components in power supply 11 include, but are not limited to, capacitors, super capacitors, batteries, and the like. In some examples, the amount of energy that may be stored in power supply 11 by the one or more power storage components may be a function of the cost and/or the size (e.g., area/volume) of the one or more power storage components. In other words, as the amount of energy stored by the one or more power storage components increases, the cost and/or the size of the one or more power storage components also increases.

Data storage device 6 may include volatile memory 12, which may be used by controller 8 to temporarily store information, including a V2P mapping table 18B. In some examples, controller 8 may use volatile memory 12 as a cache. For instance, controller 8 may store cached information in volatile memory 12 until the cached information is written to NVMAs 10. Volatile memory 12 may consume power received from power supply 11 to maintain the data stored to volatile memory 12. Examples of volatile memory 12 include, but are not limited to, random-access memory (RAM), dynamic random access memory (DRAM), static RAM (SRAM), and synchronous dynamic RAM (SDRAM—e.g., DDR1, DDR2, DDR3, DDR3L, LPDDR3, DDR4, and the like)).

NVMAs 10 may include any type of non-volatile memory devices. Some examples of NVMAs 10 include, but are not limited to, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

In some examples, NVMAs 10 may include flash memory devices that operate as mass storage for data storage device 6. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages.

NVMAs 10 may operate as mass storage and may include flash memory devices. Flash memory may have benefits such as cost, size, and durability, but flash memory may also have issues with program times, wear leveling, garbage collection, and other policies that lengthen access times. Volatile memory devices such as DRAM may have faster access times than flash memory devices. However, unlike NVMAs 10, volatile memory devices may not store data without power supply.

Data storage device 6 includes controller 8, which may manage one or more operations of data storage device 6. For instance, controller 8 may manage reading of data from and/or the writing of data to NVMAs 10 or volatile memory 12. In some examples, controller 8 may manage reading of data from and/or the writing of data to NVMAs 10 or volatile memory 12 by exchanging signals with NVMAs 10 or volatile memory 12. Controller 8 may exchange signals with NVMAs 10 or volatile memory 12 in accordance with a communication protocol. Controller 8 may include a microprocessor, digital signal processor (DSP), application specific integrated circuit (ASIC), field programmable gate array (FPGA), or other digital logic circuitry.

Controller 8 may store V2P mapping table 18A for storage device 6 to one or more non-volatile memory arrays of NVMAs 10. FIG. 1 depicts V2P mapping table 18A as stored to NVMA 10B, but V2P mapping table 18A may be stored to any one of NVMAs 10. V2P mapping table 18A may represent a table that stores associations between a virtual address and a physical address. A virtual address may include a logical block address (LBA). A physical address may include a physical block address (PBA). Controller 8 may expose virtual addresses to host device 4 to allow for more static addressing of NVMAs 10. That is, controller 8 may perform a number of operations, such as wear leveling and garbage collection, that involve repositioning of data within NVMAs 10.

Controller 8 may present the virtual address to host device 4 and maintain V2P mapping table 18A that maps the virtual address to the physical address, which may change as a result of the data repositioning operations. As controller 8 performs the data repositioning operations to move data from one addressable portion of NVMAs 10 associated with a first physical address to another addressable portion of NVMAs 10 associated with a second physical address, controller 8 may update the association in V2P mapping table 18A between the virtual address assigned to the data to associate the virtual address with the second physical address rather than the first physical address. V2P mapping table 18A may provide a layer of indirection (and hence may also be referred to as "indirection table 18A") allowing for a static virtual address to be redirected to any one of the physical addresses. Controller 8, by utilizing V2P mapping table 18A, may perform data repositioning operations without having to inform host device 4 of the changes to the underlying physical addresses.

NVMA 10B and other NVMAs 10 may also store context information regarding the location of entries in V2P mapping table 18A. Controller 8 may detect and load the context information during each boot process in order to access the entries in V2P mapping table 18A.

In some examples, controller 8 may write a copy of V2P mapping table 18A to volatile memory 12 as V2P mapping table 18B during each boot process so as to provide faster access times to V2P mapping table 18B in comparison to access times to access V2P mapping table 18A stored to NVMA 10B. V2P mapping table 18B may be a complete version of V2P mapping table 18A. In some examples, controller 8 may write V2P mapping table 18B to volatile memory 12 during each boot process given that volatile memory 12 may not be able to retain data without power.

Volatile memory 12 may have faster access times than NVMAs 10 of the mass storage area of data storage device 6. As a result, the operating system of host device 4 may experience latency with regard to read and write requests until controller 8 has written V2P mapping table 18B to volatile memory 12. The length of time to write V2P mapping table 18B to volatile memory 12 may depend on the size of V2P mapping table 18B. The size of V2P mapping table 18B may itself depend on the size of the mass storage area (i.e., NVMAs 10 in the example of FIG. 1). For example, a terabyte (TB) of storage may result in a V2P mapping table that is approximately one gigabyte (GB) in size. As storage devices 6 grow in storage capacity, the length of time to write V2P mapping table 18B to volatile memory 12 is also growing.

Given that no data may be accessed until V2P mapping table 18B is fully accessible in volatile memory 12, host device 4 may be unable to retrieve data to boot up the operating system (or other software stored to NVMAs 10) during the initial power up of host device 4. As storage devices grow in size, the boot delay due to copying V2P mapping table 18A into volatile memory 12 will also increase. Such delays may frustrate the user experience. Moreover, the boot delay may harm certain device certifications that impose certain boot times. For example, to receive the "ultrabook" certification, a device may have to boot from a powered off state (which may be referred to as a "cold boot") in 7 seconds or less.

In accordance with the techniques described in this disclosure, controller 8 may be configured to store a portion of the V2P mapping table 18C to NVMA 16, which may be separate from NVMAs 10 of the mass storage area within storage device 6. That is, NVMAs 10 may be configured to store data from host device 4 and data storage device 6, while NVMA 16 may be configured to only store data from data storage device 6. As such, NVMA 16 represents an NVMA reserved for use by data storage device 6 for the purpose of caching a portion of V2P mapping table 18A, which is shown as a portion of the V2P mapping table 18C. In contrast, data storage device 6 may use NVMAs 10 as mass storage to store user files from host device 4.

Controller 8 may select the portion of V2P mapping table 18A to store to NVMA 16 as the portion of the V2P mapping table 18C in a manner that reduces delay during the boot process. In other words, controller 8 may be configured to maintain the portion of the V2P mapping table 18C in a manner that provides entries of the portion of the V2P mapping table 18C that are frequently accessed during the boot process. Controller 8 may execute an algorithm to identify the entries of the portion of V2P mapping table 18B that are frequently accessed during the boot process of host device 4.

Although described with respect to frequency, controller 8 may execute or implement any form of algorithm to identify entries of V2P mapping table 18B to be stored to the portion of the V2P mapping table 18C. For example, controller 8 may execute or implement a machine-learning algorithm (e.g., to train an artificial neural network, perform decision tree learning or deep learning, train a Bayesian network, etc.) to identify the portion of the V2P mapping table 18C.

To further facilitate reduction of boot times, data storage device 6 may include particular types of NVMA 16 that have faster read times than other types of NVMAs. For example, NVMA 16 may utilize MRAM or PCM that have faster read times than Flash memory. Use of MRAM or PCM may further reduce boot times given the faster access times.

In operation, controller 8 stores the portion of V2P mapping table 18C prior to powering down of data storage device 6. Controller 8 also maintains V2P mapping table 18A in NVMA 10B prior to powering down of data storage device 6. When data storage device 6 is powered down (meaning, no longer supplied with power), volatile memory 12 loses V2P mapping table 18B.

Upon being powered back up (meaning, supplied with sufficient power to operate), controller 8 may receive read requests from host device 4 requesting data for booting up the operating system (e.g., the kernel of the operating system). In some examples, controller 8 may receive requests for memory operations from host device 4 for applications other than the operating system. Controller 8 may implement or execute the algorithm to identify the entries associated with each request sent during the boot up of data storage device 6, storing statistical metadata indicating which entries are accessed in response to the requests.

During the boot process of host device 4, controller 8 may also copy V2P mapping table 18A to volatile memory 12. Rather than wait until V2P mapping table 18A is fully copied to volatile memory 12 prior to responding to the read requests, controller 8 attempts to process the read requests using the portion of the V2P mapping table 18C. In other words, controller 8 may, while copying V2P mapping table 18A from NVMA 10B to volatile memory 12 and in response to read requests (or write requests), access the portion of the V2P mapping table 18C stored to NVMA 16. In this sense, controller 8 maintains what may effectively be referred to as a "NVMA cache" proximate to controller 8 (if not integrated within controller 8) that facilitates processing of read and write requests during boot up of host device 4 when V2P mapping table 18B is not yet accessible in volatile memory 12.

Controller 8 may continue to process read and/or write requests using the portion of the V2P mapping table 18C until V2P mapping table 18B is accessible in volatile memory 12. Once V2P mapping table 18B is accessible in volatile memory 12, controller 8 may process read and write requests using V2P mapping table 18B. Controller 8 may, once V2P mapping table 18B is accessible in volatile memory 12, also update the portion of the V2P mapping table 18C based on statistical metadata. For example, controller 8 may replace certain entries in the portion of the V2P mapping table 18C that were less frequently accessed than other entries as identified by the statistical metadata.

In this manner, controller 8 may store a portion of V2P mapping table 18A in local NVMA 16 so as to reduce the impact in terms of boot delay due to loading V2P mapping table from the mass storage area of storage device 6 (i.e., NVMA 10B in the example of FIG. 1) to volatile memory 12. Controller 8 may employ an algorithm in an attempt to select the portions of V2P mapping table 18A that are frequently accessed by host device 4 during the boot process. As such, controller 8 may more quickly process read or write requests using V2P mapping table 18C while loading V2P mapping table 18B into volatile memory 12. Moreover, NVMA 16 may be configured as a particular type of NVMA that has faster access times than other types of NVMA to further facilitate read and write requests processing during the boot process. The techniques may therefore promote a better user experience while also providing for faster boot times (relative to data storage devices that do not feature NVMA 16 storing a portion of V2P mapping table 18A) to facilitate successful device certification.

Although described as being performed during the boot process, controller 8 may be configured to perform the techniques of this disclosure during any time when V2P mapping table 18B is not accessible in volatile memory 12. V2P mapping table 18B may not be accessible in volatile memory 12 when locked for other read or write tasks (such as garbage collection or wear leveling). Generally, the techniques may be performed during any period of time in which V2P mapping table 18B is not accessible in volatile memory 12.

Figure 2:
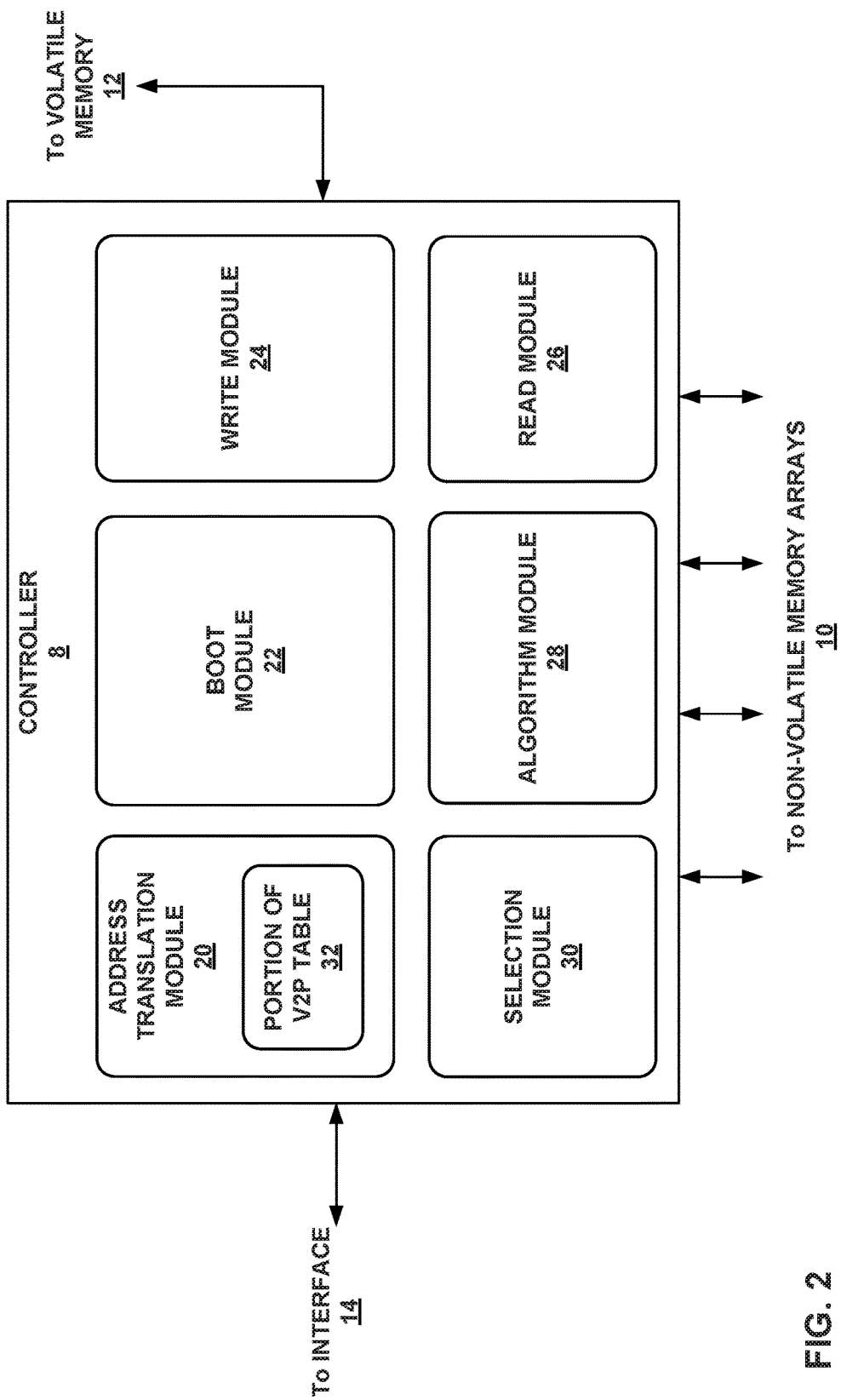
FIG. 2 is a conceptual block diagram illustrating various modules within a controller, in accordance with one or more techniques of this disclosure.

FIG. 2 is a conceptual block diagram illustrating various modules within a controller 8, in accordance with one or more techniques of this disclosure. In some examples, controller 8 may include an address translation module 20, a boot module 22, a write module 24, a read module 26, an algorithm module 28, and a selection module 30. In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry.

Controller 8 may interface with host device 4 via interface 14 and manage the storage of data to and the retrieval of data from NVMAs 10 and volatile memory 12. For example, write module 24 of controller 8 may manage writes to NVMAs 10. Write module 24 may receive a message from host device 4 via interface 14 instructing data storage device 6 to store data associated with a LBA and the data. Similarly, read module 26 may manage the reading of data from NVMAs 10 and volatile memory 12.

Address translation module 20 may track write operations performed by write module 24 to NVMAs 10. Address translation module 20 may also track erasures of data in NVMAs 10. The tracking of write and erase operations may be known as journaling or logging. Address translation module 20 may keep a journal, snapshot, or log of the write and erase operations in order to update the V2P mapping tables stored to NVMA 10B and volatile memory 12. Address translation module 20 may use the journal, snapshot, or log to update the portion of the V2P mapping table 32 stored to NVMA 16. The portion of the V2P mapping table 32 may be a partial copy of the complete version of V2P mapping table 18A stored to NVMA 10B of the mass storage area of data storage device 6. The portion of the V2P mapping table 32 may be a map-based or tree-based structure instead of, or in combination with, a partial copy of V2P mapping table 18A. The portion of the V2P mapping table 32 may reside within address translation module 20, selection module 30, another module in controller 8, or outside of controller 8.

Complete versions of V2P mapping table 18A, 18B stored to NVMA 10B and volatile memory 12 may include markers indicating whether each entry in the full table is stored in the portion of the V2P mapping table 18C stored to NVMA 16. Each marker in the V2P mapping table 18A, 18B stored to NVMA 10B and volatile memory 12 may include a dirty bit that indicates whether the portion of the complete version of the V2P mapping table 18C stored to NVMA 16 has been updated with the latest write and erase operations. Dirty entries may be entries in the portion of the V2P mapping table 18C stored to NVMA 16 that have been modified in NVMA 16 but not modified in V2P mapping table 18A or V2P mapping table 18Bs. Data storage device 6 may store dirty entries in a temporary location when powering off. During the next boot process, data storage device 6 may read the dirty entries from the temporary location or wait until V2P mapping table 18B is available in volatile memory 12.

Address translation module 20 may update the V2P mapping tables before data storage device 6 powers off. If data storage device 6 loses power suddenly, address translation module 20 may update V2P mapping table 18A stored to NVMA 10B before shutdown or during the next boot process. Address translation module 20 may recreate portions of V2P mapping table 18A using snapshots and journals that were saved when data storage device 6 powered off, which may increase the time needed for a boot process.

FIG. 2 depicts NVMAs 10 as outside of controller 8. In some examples, however, NVMA 16, which may store the portion of the V2P mapping table 32, may be inside controller 8 or at another location within data storage device 6 outside of the mass storage area. NVMA 16 may also reside within an SSD card inside data storage device 6. The location of NVMA 16 may affect how quickly read module 26 can read the portion of the V2P mapping table 32.

For example, write module 24 may communicate with address translation module 20, which manages translation between LBAs used by host device 4. Address translation module 20 may manage storage locations of data and PBAs used by write module 24. Address translation module 20 of controller 8 may utilize V2P mapping table 18A stored to NVMA 10B that translates LBAs of data stored by NVMAs 10 into PBAs indicating the physical location of the data within data storage device 6. For example, host device 4 may utilize the LBAs of the data stored by NVMAs 10 in instructions or messages to data storage device 6, while write module 24 may utilize PBAs to control writing of data to NVMAs 10. Similarly, read module 26 may utilize PBAs to control reading of data from NVMAs 10.

In this way, host device 4 may be allowed to use a static LBA for a certain set of data, while the PBA at which the data is actually stored may change. Address translation module 20 may maintain V2P mapping table 18A stored to NVMA 10B to map the LBAs to PBAs to allow use of the static LBA by the host device 4 while the PBA of the data may change, e.g., due to wear leveling, garbage collection, or the like. Address translation module 20 may maintain a journal, snapshot, or log to track write and erase operations that affect the data stored to the mass storage of data storage device 6. Address translation module 20 may update the V2P mapping tables based on the journal, snapshot, or log.

Address translation module 20 may maintain the V2P mapping tables stored to NVMA 10B and volatile memory 12, as well as the portion of the V2P mapping table 32 stored to NVMA 16. The V2P mapping tables may contain entries for the data stored to the mass storage area of data storage device 6. Address translation module 20 may use various formats to store entries in the V2P mapping tables, such as hash tables or hash dictionaries, set/fully associative tables, and/or tree-based indirection system. Address translation module 20 may use any of these formats, a combination or modification thereof, or other formats not listed herein.

As discussed above, write module 24 of controller 8 may perform one or more operations to manage the writing of data to NVMAs 10. For example, write module 24 may manage the writing of data to NVMAs 10 by selecting one or more blocks within NVMAs 10 to store the data and causing the memory devices of NVMAs 10 that include the selected blocks to actually store the data. As discussed above, write module 24 may cause address translation module 20 to update the V2P mapping tables based on the selected blocks. For instance, write module 24 may receive a message from host device 4 that includes a unit of data and an LBA, select a block within a particular memory device of NVMAs 10 to store the data, cause the particular memory device of NVMAs 10 to actually store the data, and cause address translation module 20 to update V2P mapping table 18B stored to volatile memory 12 to indicate that the LBA corresponds to the selected block within the particular memory device.

For each update to V2P mapping table 18B in volatile memory 12, write module 24 may also update V2P mapping table 18A stored to NVMA 10B. Write module 24 may also update the portion of the V2P mapping table 32 stored to NVMA 16, if the update affects an entry in the portion of the V2P mapping table 32 stored to NVMA 16. The update may occur immediately after the update in volatile memory 12, or address translation module 20 may maintain a journal of updates to send to write module 24 at a later time. If data storage device 6 suddenly loses power, address translation module 20 may update V2P mapping table 18A stored to NVMA 10B and the portion of the V2P mapping table 32 stored to NVMA 16 before shutdown or during the next boot process.

The V2P mapping tables also may facilitate division of data received from host device 4 across a plurality of PBAs. For example, in some instances, the data received from host device 4 may be in units that are larger than a single block. As such, controller 8 may select multiple blocks to each store a portion of the unit of data. As opposed to selecting multiple blocks within a single memory device of NVMAs 10 to store the portions of the unit of data, controller 8 may select blocks from a plurality of NVMAs 10 to store the portions of the unit of data. Controller 8 may then cause the plurality of memory devices in NVMAs 10 to store the portions of the unit of data in parallel. In this way, controller 8 may increase the rate at which data may be stored to NVMAs 10 by writing portions of the data to different memory devices in NVMAs 10.

In order to write a bit with a logical value of 0 (charged) to a bit with a previous logical value of 1 (uncharged), a large current is used. This current may be sufficiently large that it may cause inadvertent changes to the charge of adjacent flash memory cells. To protect against inadvertent changes, an entire block of flash memory cells may be erased to a logical value of 1 (uncharged) prior to writing any data to cells within the block. Because of this, flash memory cells may be erased at the block level and written at the page level.

Thus, to write even an amount of data that would consume less than one page, controller 8 may cause an entire block to be erased. This may lead to write amplification, which refers to the ratio between the amount of data received from host device 4 to be written to NVMAs 10 and the amount of data actually written to NVMAs 10. Write amplification contributes to faster wearing of the flash memory cells than would occur with no write amplification. Wear to flash memory cells may occur when flash memory cells are erased due to the relatively high voltages used to erase the flash memory cells. Over a plurality of erase cycles, the relatively high voltages may result in physical changes to the flash memory cells. Eventually, the flash memory cells may wear out, such that data may no longer be written to the cells.

Boot module 22 may control the operation of data storage device 6 during each boot process. For example, boot module 22 may orchestrate the recovery, loading, and recreation of context information and drive configurations, such as the indirection system, during the boot process. Boot module 22 may direct write module 24 to store V2P mapping table 18B to volatile memory 12. Boot module 22 may also determine what entries to store in the portion of the V2P mapping table 32 stored to NVMA 16. Boot module 22 may direct read module 26 to obtain a PBA from NVMA 16 if host device 4 requests data that is listed in the portion of the V2P mapping table 32.

Read module 26 may control reading of data from NVMAs 10 and volatile memory 12. For example, read module 26 may receive a message from host device 4 requesting data with an associated LBA. Read module 26 may determine whether the requested data is listed in the portion of the V2P mapping table 32 stored to NVMA 16. If the requested data is listed in the portion of the V2P mapping table 32 stored to NVMA 16, read module 26 may read the portion of the V2P mapping table 32 and deliver one or more PBAs to address translation module 20.

Selection module 30 may determine what entries to store in the portion of the V2P mapping table 32 stored to NVMA 16. Selection module 30 may choose pages that are frequently accessed by host device 4 during the boot process. Selection module 30 may interact with algorithm module 28 to decide which algorithm to use for selecting pages to store in the portion of the V2P mapping table 32. Algorithm module 28 may employ caching algorithms or methods such as discrete drive namespace, algorithms that learn data access patterns, time/counter-based cache during the first boot access of data storage device 6, dynamic-or profile-based algorithms during normal operation of data storage device 6, and/or static/host directed commands. A counter-based profile may track the data requested by host device 4 during a boot process to prepare for future boot processes. Algorithm module 28 may employ hash-based and/or tree-based methods to select and store entries for the portion of the V2P mapping table 32. Algorithm module 28 may employ any of these algorithms or methods, including a combination, hybrid, or modification of any number of the algorithms or methods. Algorithm module 28 may also employ algorithms or methods not listed herein.

Selection module 30 may also communicate with host device 4 to select the entries in the portion of the V2P mapping table 32. Host device 4 may determine and communicate which data are crucial during the boot processes to selection module 30, and selection module 30 may list the crucial data in the portion of the V2P mapping table 32 stored to NVMA 16. In addition, selection module 30 may track which data host device 4 requests during each boot process. Selection module 30 may then list the most requested data in the portion of the V2P mapping table 32.

In accordance with one or more examples of this disclosure, data storage device 6 (e.g., boot module 22) may determine whether write module 24 has written the V2P mapping table to volatile memory 12. If write module 24 has written the V2P mapping table to volatile memory 12, boot module 22 may direct read module 26 to read one or more entries from V2P mapping table 18B stored to volatile memory 12. If the write module 24 has not written V2P mapping table 18B to volatile memory 12, boot module 22 may determine whether a page is listed in the portion of the V2P mapping table 32 stored to NVMA 16. If the page is listed in the portion of the V2P mapping table 32, boot module 22 may direct read module 26 to read one or more entries from the portion of the V2P mapping table 32 stored to NVMA 16. If the page is not listed in the portion of the V2P mapping table 32, boot module 22 may direct read module 26 to wait until write module 24 writes V2P mapping table 18B to volatile memory 12.

Boot module 22 may have various methods for handling a situation in which host device 4 requests data that is not stored in the portion of the V2P mapping table 32 stored to NVMA 16. In such situations, boot module 22 may retrieve the PBA from NVMAs 10 or from an incomplete V2P mapping table 18B stored to volatile memory 12. Boot module 22 may also delay read module 26 until the V2P mapping table 18B is completely stored to volatile memory 12.

Figure 3:
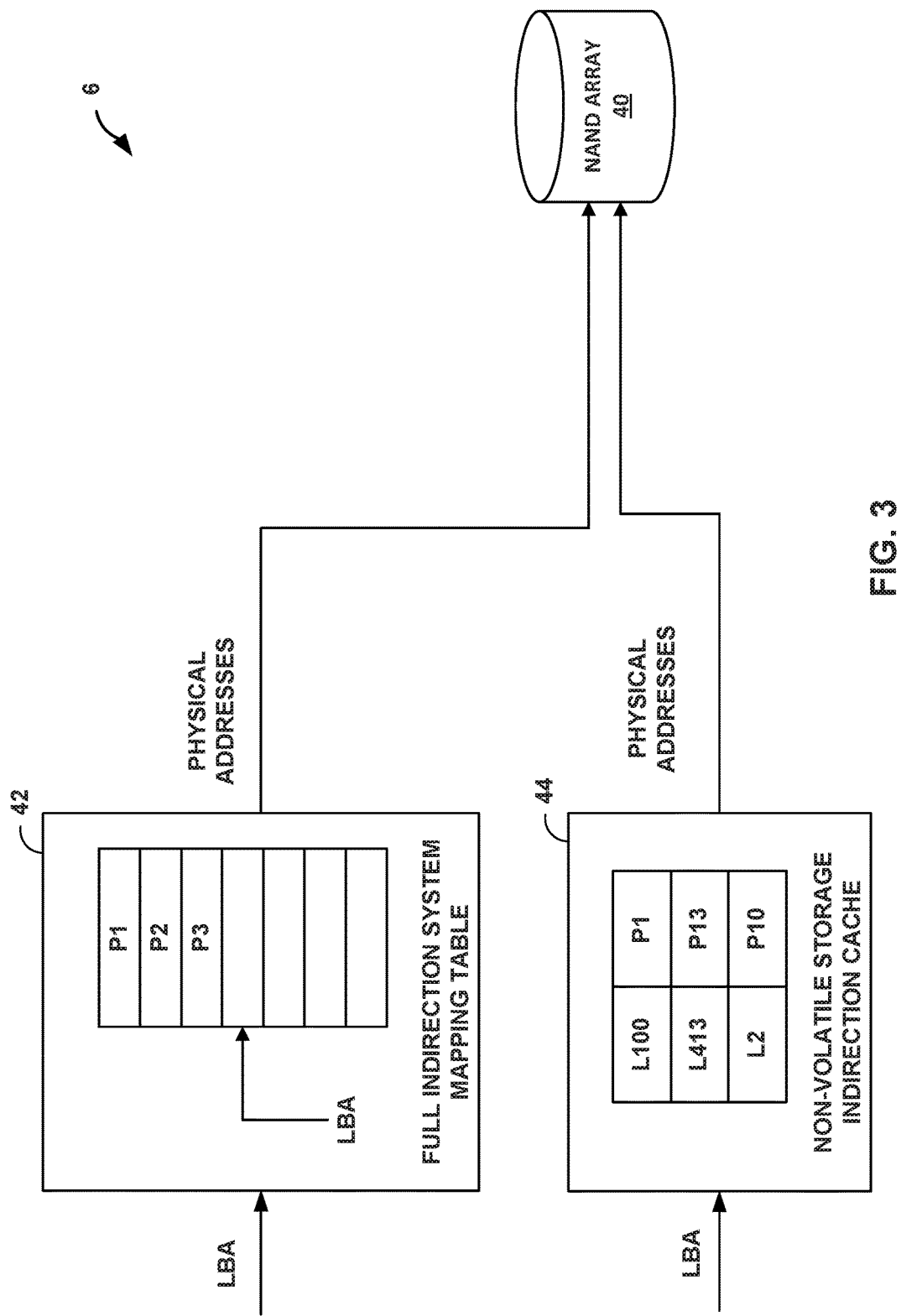
FIG. 3 is a conceptual block diagram illustrating V2P mapping tables stored to volatile and non-volatile memory arrays, in accordance with one or more techniques of this disclosure.

FIG. 3 is a conceptual block diagram illustrating V2P mapping tables stored to volatile and non-volatile memory arrays 40, 42, 44, in accordance with one or more techniques of this disclosure. Data storage device 6 may include one or more volatile memory arrays 42 and NVMAs 40, 44. The volatile memory and non-volatile memory in data storage device 6 may be any suitable type of memory, including flash memory devices, a hard disk drive, DRAM, PCM, MRAM, or any other suitable type of memory.

In some examples, NAND array 40 may store a complete version of the V2P mapping table for data storage device 6. For example, the complete version of the V2P mapping table may contain entries for all of the data stored to NAND array 40. The V2P mapping table stored to NAND array 40 may contain entries that match each page of data to a PBA in data storage device 6. The V2P mapping table stored to NAND array 40 may contain one or more pairs of LBAs and PBAs. In some examples, if data storage device 6 has a capacity of one terabyte, the V2P mapping table may take up approximately one gigabyte of storage space in NAND array 40. Data storage device 6 may update the V2P mapping table stored to NAND array 40 with new write and erase operations before data storage device 6 powers down. In the event of a sudden power loss, data storage device 6 may update the V2P mapping table stored to NAND array 40 before shutdown or when power is restored.

NAND array 40 may be non-volatile memory that retains data even when data storage device 6 is powered off. NAND array 40 may be configured to store data from data storage device 6 and a host device. NAND array 40 may have slower access times than volatile memory 42 and NVMA 44. NAND array 40 may, however, have a much larger storage capacity than volatile memory 42 and NVMA 44. Data storage device 6 may use NAND array 40 for mass storage because of the cost, size, and durability of NAND array 40, as compared to the cost, size, and durability of volatile memory 42, NVMA 44, and other types of memory.

Volatile memory 42 may store a copy of the complete version of the V2P mapping table when data storage device 6 powers on. Data storage device 6 may write the complete version of the V2P mapping table to volatile memory 42 during each boot process. The time to reconstruct the V2P mapping table in volatile memory 42 during each boot process may be related to the size of the V2P mapping table. The time to reconstruct the V2P mapping table in volatile memory 42 may affect the user experience at startup. During the reconstruction period, a host device may not be able to access pages stored to NAND array 40 because the host device may not have the PBAs of the pages.

The V2P mapping table stored to volatile memory may list LBAs sequentially or in some other format. When the host device requests a page by providing an LBA, controller 8 may find the matching PBA stored to volatile memory 42. In a similar manner, when the host device sends data to data storage device 6 for writing to NAND array 40, volatile memory 42 may place the PBA of the data in the V2P mapping table. Volatile memory 42 may place the PBA of the data into the V2P mapping table at the LBA provided by the host device, as shown in FIG. 3. Data storage device 6 may update the V2P mapping table stored to volatile memory 42 and the portion of the V2P mapping table stored to NVMA 44 for each write and erase operation in NAND array 40. Data storage device 6 may update entries in the V2P mapping table stored to NAND array 40 less frequently than the entries in the V2P mapping table stored to volatile memory 42 and the portion of the V2P mapping table stored to NVMA 44.

Volatile memory 42 may have faster access times than NAND array 40. By storing the V2P mapping table to volatile memory 42, a host device may quickly access and read pages by quickly determining the PBAs for the pages. However, volatile memory 42 may have a higher cost per byte than NAND array 40 and consume more power per byte than NAND array 40.

NVMA 44 may store a portion of the V2P mapping table that includes entries that a host device may request during a boot process. The portion of the V2P mapping table may include a subset, but not all, of the V2P mapping tables that are stored to NAND array 40 and volatile memory 42. The entries in the portion of the V2P mapping table may correspond to pages that the host device is likely to request during a boot process. Data storage device 6 may use an algorithm to select the entries to include in the portion of the V2P mapping table stored to NVMA 44.

As shown in FIG. 3, the portion of the V2P mapping table stored to NVMA 44 may list LBAs and PBAs. NVMA 44 may list the entries sequentially or in any other suitable format. When a host device requests a page at an LBA, data storage device 6 may obtain the corresponding PBA from NVMA 44 to determine the physical location of data stored to NAND array 40.

Like NAND array 40, NVMA 44 may be non-volatile memory, but NVMA 44 may be separate from NAND array 40. NVMA 44 may be configured to only store data from data storage device 6 and not data from a host device. Both NAND array 40 and NVMA 44 may reside in data storage device 6. In some examples, NVMA 44 may reside within an SSD card in data storage device 6.

NVMA 44 may be much smaller in size and in storage capacity than NAND array 40 for various reasons. NVMA 44 may be more expensive per byte than NAND array 40. As a result, it may not be cost-effective to construct an entire storage device from NVMA 44. In some examples, NVMA 44 may be a type of memory, such as PCM or MRAM, that has faster access times than NAND array 40 and retains data when data storage device 6 powers off.

Figure 4:
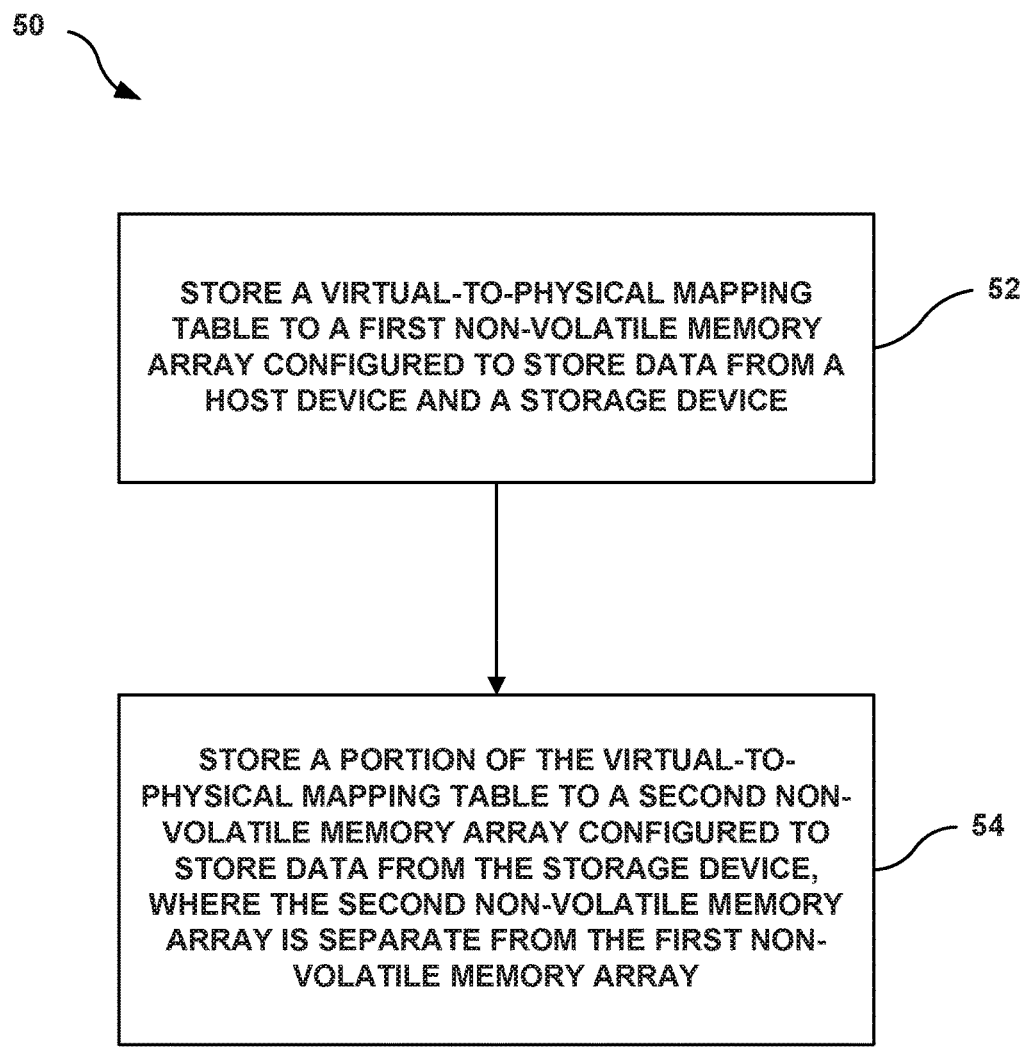
FIG. 4 is a flowchart illustrating an example technique for storing a portion of a V2P mapping table, in accordance with one or more techniques of this disclosure.

FIG. 4 is a flowchart illustrating an example technique for storing a portion of a V2P mapping table, in accordance with one or more techniques of this disclosure. Technique 50 is described with respect to the system of FIG. 1, including controller 8, although other components, such as controller 8 in FIG. 2 or data storage device 6 in FIG. 3, may perform similar techniques.

The technique of FIG. 4 includes storing V2P mapping table 18A to a first non-volatile memory array 10B (52). The first NVMA 10B may be configured to store data from host device 4 and data storage device 6. NVMA 10B may be located of the mass storage area of data storage device 6. The V2P mapping table 18A stored to NVMA 10B may contain entries matching the LBAs used by host device 4 to the PBAs where data is stored to the mass storage area of NVMAs 10. Unlike volatile memory 12, the first NVMA 10B may be able to retain data when data storage device 6 powers down.

The technique of FIG. 4 also includes storing a portion of the V2P mapping table 18C to a second NVMA 16 that is separate from the first NVMA 10B (54). The second NVMA 16 may be configured to store data from data storage device 6. NVMA 16 may reside outside of the mass storage area of data storage device 6. NVMA 16 may contain a subset of the entries of the complete version of the V2P mapping table 18A stored to NVMA 10B. The subset may contain entries for data that are frequently accessed by host device 4 during the boot process. The second NVMA 16 may be able to retain data when data storage device 6 powers down. The second NVMA 16 may also have faster access times than NVMA 10B, which may improve the performance of data storage device 6 during boot processes.

Figure 5:
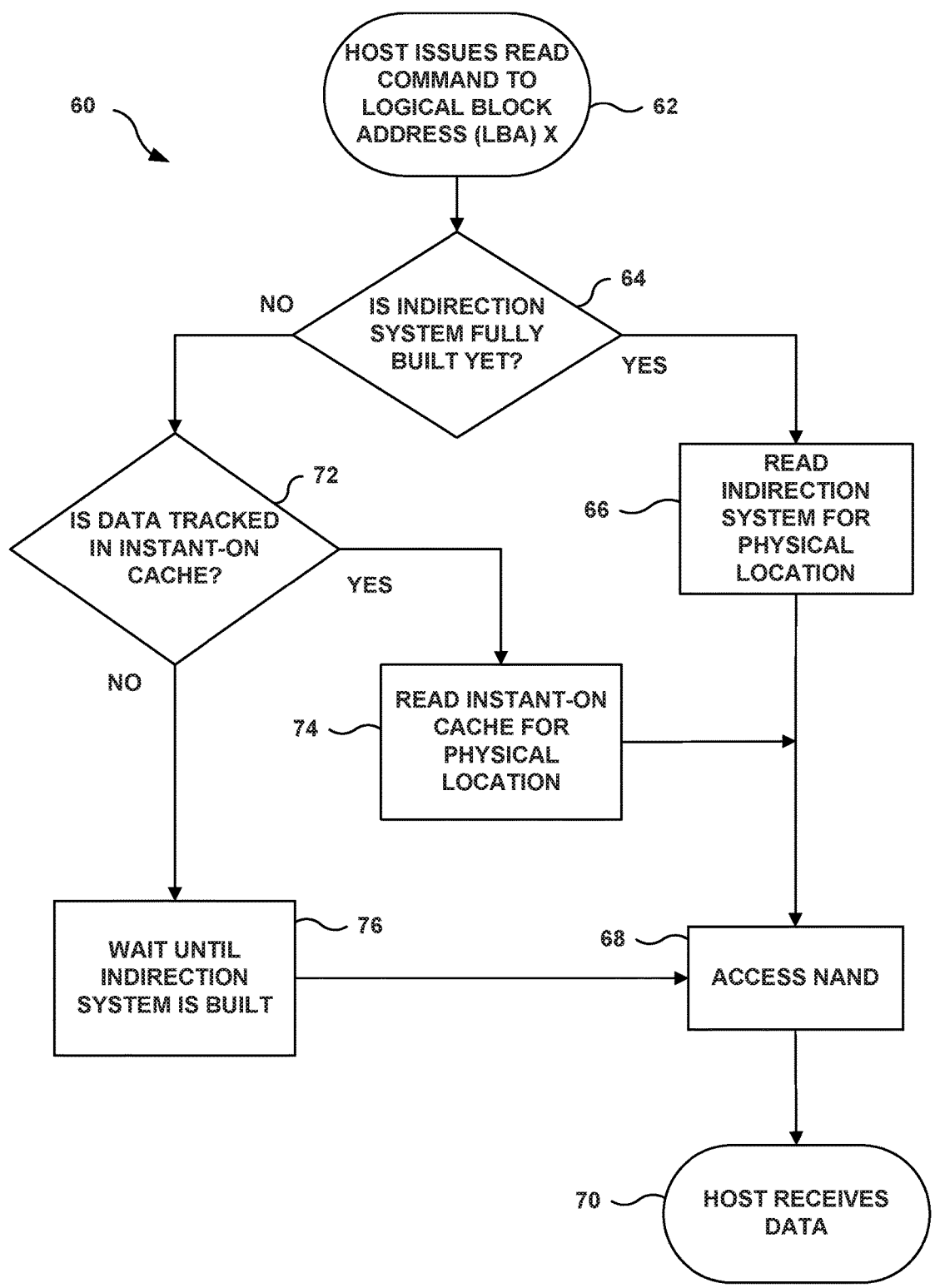
FIG. 5 is a flowchart illustrating an example technique for accessing a V2P mapping table during startup, in accordance with one or more techniques of this disclosure.

FIG. 5 is a flowchart illustrating an example technique for accessing a V2P mapping table during startup, in accordance with one or more techniques of this disclosure. Technique 60 is described with respect to the system of FIG. 1, including controller 8, although other components, such as controller 8 in FIG. 2 or data storage device 6 in FIG. 3, may perform similar techniques.

The technique of FIG. 5 includes receiving, at data storage device 6, a read command issued by host device 4 for LBA X (62). Host device 4 may request a page by providing the LBA that host device 4 has assigned to that page to data storage device 6. Address translation module 20 in controller 8 may receive the LBA and may be responsible for determining the matching PBA.

The technique of FIG. 5 also includes determining whether the indirection system is fully built in volatile memory 12 (64). The indirection system may include a complete version of the V2P mapping table 18B that is stored to volatile memory 12. Data storage device 6 may write the complete version of V2P mapping table 18B to volatile memory 12 during each boot process of data storage device 6. The indirection system may be fully built when the complete version of V2P mapping table 18B is accessible and updated in volatile memory 12.

If the indirection system is fully built, the technique of FIG. 5 also includes reading the indirection system for a physical location associated with LBA X (66). The V2P mapping table in the indirection system may contain entries that match LBAs and PBAs. Address translation module 20 may direct read module 26 in controller 8 to read volatile memory 12 to obtain the PBA that matches LBA X, as requested by host device 4.

After reading the indirection system, the technique of FIG. 5 also includes accessing a NAND array (68). The NAND array may be located in NVMAs 10 and may operate as mass storage for data storage device 6. Read module 26 may read NVMAs 10 to obtain the data requested by host device 4. Read module 26 may read data from the PBA that corresponds to LBA X.

After accessing the NAND array, the technique of FIG. 5 also includes sending the requested data to host device 4 (70). Read module 26 in controller 8 may transmit the requested data to host device 4 via interface 14.

If the indirection system is not fully built, the technique of FIG. 5 includes determining whether the requested data is tracked in an instant-on cache (72). The instant-on cache may be located in NVMA 16 where a portion of the V2P mapping table 18C is stored. The instant-on cache may not be instantaneous in the strict definition of "instant," but it may appear to be instantaneous to a human user. Controller 8 may determine whether NVMA 16 stores an entry for LBA X in the portion of the V2P mapping table 18C.

If the instant-on cache in NVMA 16 tracks the requested data, the technique of FIG. 5 also includes reading the instant-on cache for the physical location of the requested data (74). Address translation module 20 may direct read module 26 to read the portion of the V2P mapping table stored to NVMA 16 to obtain the PBA associated with LBA X.

After reading the instant-on cache, the technique of FIG. 5 includes accessing the NAND array (68). The NAND array may be located in NVMAs 10 and may operate as mass storage for data storage device 6. Read module 26 may read NVMAs 10 to obtain the data requested by host device 4. Read module 26 may read data from the PBA that corresponds to LBA X. After accessing the NAND array, the technique of FIG. 5 also includes sending the requested data to host device 4 (70). Read module 26 in controller 8 may transmit the requested data to host device 4 via interface 14.

If the instant-on cache does not track the requested data, the technique of FIG. 5 includes waiting until the indirection system is built (76). Write module 24 may build the indirection system by writing the V2P mapping table 18B to volatile memory 12. Building the indirection system may also include updating the V2P mapping table 18B. After the indirection system is built, address translation module 20 may direct read module 26 to obtain the PBA that corresponds to LBA X by reading V2P mapping table 18B that is stored to volatile memory 12.

After obtaining the PBA, the technique of FIG. 5 includes accessing the NAND array (68). The NAND array may be located in NVMAs 10 and may operate as mass storage for data storage device 6. Read module 26 may read NVMAs 10 to obtain the data requested by host device 4. Read module 26 may read data from the PBA that corresponds to LBA X. After accessing the NAND array, the technique of FIG. 5 also includes sending the requested data to host device 4 (70). Read module 26 in controller 8 may transmit the requested data to host device 4 via interface 14.

The following examples may illustrate one or more of the techniques of this disclosure.

EXAMPLE 1

A storage device includes a first non-volatile memory array configured to store data from a host device and the storage device and a second non-volatile memory array configured to store data from the storage device, where the secod non-volatile memory array is separate from the first non-volatile memory array. The storage device also includes a controller configured to store a virtual-to-physical mapping table to the first non-volatile memory array and store a portion of the virtual-to-physical mapping table to the second non-volatile memory array.

EXAMPLE 2

The storage device of example 1, wherein the controller is further configured to select, using an algorithm, entries from the virtual-to-physical mapping table to store to the second non-volatile memory array.

EXAMPLE 3

The storage device of examples 1 or 2, wherein the algorithm comprises one of a discrete drive namespace, a machine learning algorithm, or a profile-based algorithm.

EXAMPLE 4

The storage device of any one of examples 1 to 3, wherein the controller is configured to store a complete version of the virtual-to-physical mapping table to the first non-volatile memory array. The controller is further configured to store, during a boot process, the complete version of the virtual-to-physical mapping table to a volatile memory array.

EXAMPLE 5

The storage device of any one of examples 1 to 4, wherein the controller is further configured to determine that the virtual-to-physical mapping table is not accessible in a volatile memory array. The controller is further configured to determine that an entry is located in the portion of the virtual-to-physical mapping table stored to the second non-volatile memory array. The controller is further configured to read the entry from the portion of the virtual-to-physical mapping table stored to the second non-volatile memory array.

EXAMPLE 6

The storage device of any one of examples 1 to 5, wherein the controller is further configured to determine that the virtual-to-physical mapping table stored to the first non-volatile memory array is not accessible in a volatile memory array during a boot process. The controller is further configured to determine that an entry is not stored in the portion of the virtual-to-physical mapping table stored to the second non-volatile memory array during the boot process. The controller is further configured to read the entry from the virtual-to-physical mapping table when the virtual-to-physical mapping table is accessible in the volatile memory array.

EXAMPLE 7

The storage device of any one of examples 1 to 6, wherein the first non-volatile memory array comprises a flash memory array, and wherein the second non-volatile memory array comprises one of a magnetoresistive random-access memory array or a phase-change memory array.

EXAMPLE 8

The storage device of any one of examples 1 to 7, wherein the portion of the virtual-to-physical mapping table stored to the second non-volatile memory array comprises a hash table, an associative table, or a tree-based indirection system.

EXAMPLE 9

The storage device of any one of examples 1 to 8, wherein the controller is configured to update the portion of the virtual-to-physical mapping table stored to the second non-volatile memory array before the storage device powers off.

EXAMPLE 10

The storage device of any one of examples 1 to 9, wherein the virtual-to-physical mapping table indicates one or more pairs of a logical address and a physical address.

EXAMPLE 11

The storage device of any one of examples 1 to 10, wherein the second non-volatile memory array is configured to only store data from the storage device and not data from the host device.

EXAMPLE 12

The storage device of any one of examples 1 to 11, wherein the portion of the virtual-to-physical mapping table stored to the second non-volatile memory array comprises a copy of a portion of the virtual-to-physical mapping table stored to the first non-volatile memory array.

EXAMPLE 13

The storage device of any one of examples 1 to 12, wherein the first non-volatile memory array is located in a mass storage area of the storage device, and wherein the second non-volatile memory array is located in the controller.

EXAMPLE 14

The storage device of any one of examples 1 to 13, wherein the controller is further configured to, while copying the virtual-to-physical mapping table stored to the first non-volatile memory array to a volatile memory array and in response to a read request or write request, access the portion of the virtual-to-physical mapping table stored to the second non-volatile memory array.

EXAMPLE 15

A method includes storing, by a controller of a storage device, a virtual-to-physical mapping table to a first non-volatile memory array configured to store data from a host device and the storage device. The method also includes storing, by the controller, a portion of the virtual-to-physical mapping table to a second non-volatile memory array configured to store data from the storage device, wherein the second non-volatile memory array is separate from the first non-volatile memory array.

EXAMPLE 16

The method of example 15, further including selecting, by the controller and using an algorithm, entries from the virtual-to-physical mapping table to store to the second non-volatile memory array.

EXAMPLE 17

The method of any one of examples 15 to 16, further including determining, by the controller, that the virtual-to-physical mapping table is not accessible in a volatile memory array. The method further includes determining, by the controller, that an entry is located in the portion of the virtual-to-physical mapping table stored to the second non-volatile memory array. The method further includes reading, by the controller, the entry from the portion of the virtual-to-physical mapping table stored to the second non-volatile memory array.

EXAMPLE 18

The method of any one of examples 15 to 17, further including determining, by the controller, that the virtual-to-physical mapping table stored to the first non-volatile memory array is not accessible in a volatile memory array during a boot process. The method further includes determining, by the controller, that an entry is not stored in the portion of the virtual-to-physical mapping table stored to the second non-volatile memory array during the boot process. The method further includes reading, by the controller, the entry from the virtual-to-physical mapping table when the virtual-to-physical mapping table is accessible in the volatile memory array.

EXAMPLE 19

The method of any one of examples 15 to 18, wherein the first non-volatile memory array comprises a flash memory array, and wherein the second non-volatile memory array comprises one of a magnetoresistive random-access memory array or a phase-change memory array.

EXAMPLE 20

The method of any one of examples 15 to 19, further comprising, while copying the virtual-to-physical mapping table stored to the first non-volatile memory array to a volatile memory array and in response to a read request or write request, access the portion of the virtual-to-physical mapping table stored to the second non-volatile memory array.

EXAMPLE 21

A computer-readable storage device includes instructions that, when executed, configure one or more processors of the storage device to store a virtual-to-physical mapping table to a first non-volatile memory array configured to store data from a host device and the storage device; and store a portion of the virtual-to-physical mapping table to a second non-volatile memory array configured to store data from and the storage device, wherein the second non-volatile memory array is separate from the first non-volatile memory array.

EXAMPLE 22

The computer-readable storage medium of example 18, further including instructions that, when executed, cause the one or more processors to perform the method of any one of examples 15 to 20.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded with instructions, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A storage device comprising:
   a first non-volatile memory array configured to store data from a host device and the storage device;
   a second non-volatile memory array configured to store data from the storage device, wherein the second non-volatile memory array is separate from the first non-volatile memory array;
   a volatile memory configured to store information, including a virtual-to-physical mapping table;
   a controller configured to:
   process read and write commands using a portion of the virtual-to-physical mapping table during boot up, wherein the portion of the virtual-to-physical mapping table is less than all the virtual-to-physical mapping table, wherein the portion of the virtual-to-physical mapping table is stored in the second non-volatile memory array;
   copy the virtual-to-physical mapping table from the first non-volatile memory array to the volatile memory array, wherein in the copying occurs during boot up;
   store the virtual-to-physical mapping table to the first non-volatile memory array;
   store a portion of the virtual-to-physical mapping table to the second non-volatile memory array;
   perform a wear leveling and a garbage collection operation;
   reposition data within the second non-volatile memory array based upon the wear leveling and garbage collection; and
   update the virtual-to-physical mapping table based upon the repositioned data within the second non-volatile memory array.

2. The storage device of claim 1, wherein the controller is further configured to, while copying the virtual-to-physical mapping table stored to the first non-volatile memory array to the volatile memory and in response to a read request or write request, access the portion of the virtual-to-physical mapping table stored to the second non-volatile memory array.

3. The storage device of claim 1, wherein the controller is further configured to select, using an algorithm, entries from the virtual-to-physical mapping table to store to the second non-volatile memory array.

4. The storage device of claim 3, wherein the algorithm comprises a machine learning algorithm.

5. The storage device of claim 1, wherein the controller is configured to store a complete version of the virtual-to-physical mapping table to the first non-volatile memory array, and
   wherein the controller is further configured to store, during a boot process, the complete version of the virtual-to-physical mapping table to the volatile memory.

6. The storage device of claim 1, wherein the controller is further configured to:
   determine that the virtual-to-physical mapping table is not accessible in the volatile memory;
   determine that an entry is located in the portion of the virtual-to-physical mapping table stored to the second non-volatile memory array; and
   read the entry from the portion of the virtual-to-physical mapping table stored to the second non-volatile memory array.

7. The storage device of claim 1, wherein the controller is further configured to:
   determine that the virtual-to-physical mapping table stored to the first non-volatile memory array is not accessible in the volatile memory during a boot process;
   determine that an entry is not stored in the portion of the virtual-to-physical mapping table stored to the second non-volatile memory array during the boot process; and
   read the entry from the virtual-to-physical mapping table when the virtual-to-physical mapping table is accessible in the volatile memory.

8. The storage device of claim 1,
   wherein the first non-volatile memory array comprises a flash memory array, and
   wherein the second non-volatile memory array comprises one of a magnetoresistive random-access memory array or a phase-change memory array.

9. The storage device of claim 1, wherein the portion of the virtual-to-physical mapping table stored to the second non-volatile memory array comprises a hash table, an associative table, or a tree-based indirection system.

10. The storage device of claim 1, wherein the controller is configured to update the portion of the virtual-to-physical mapping table stored to the second non-volatile memory array before the storage device powers off.

11. The storage device of claim 1, wherein the virtual-to-physical mapping table indicates one or more pairs of a logical address and a physical address.

12. The storage device of claim 1, wherein the second non-volatile memory array is configured to only store data from the storage device and not data from the host device.

13. The storage device of claim 1, wherein the portion of the virtual-to-physical mapping table stored to the second non-volatile memory array comprises a copy of a portion of the virtual-to-physical mapping table stored to the first non-volatile memory array.

14. The storage device of claim 1,
wherein the first non-volatile memory array is located in a mass storage area of the storage device, and
wherein the second non-volatile memory array is located in the controller.

15. A method comprising:
storing, by a volatile memory of a storage device, information including a virtual-to-physical mapping table;
storing, by a controller of a storage device, the virtual-to-physical mapping table to a first non-volatile memory array configured to store data from a host device and the storage device;
storing, by the controller, a portion of the virtual-to-physical mapping table to a second non-volatile memory array configured to store data from the storage device, wherein the second non-volatile memory array is separate from the first non-volatile memory array;
performing, by a controller a wear leveling and a garbage collection operation;
repositioning data within the non-volatile memory array based upon the wear leveling and garbage collection;
updating, by the controller the virtual-to-physical mapping table based upon the repositioned data within the second non-volatile memory array;
processing, by the controller, read and write commands using a portion of the virtual-to-physical mapping table during boot up, wherein the portion of the virtual-to-physical mapping table is less than all the virtual-to-physical mapping table, wherein the portion of the virtual-to-physical mapping table is stored in the second non-volatile memory array; and
copying, by the controller the virtual-to-physical mapping table from the first non-volatile memory array to the volatile memory array, wherein in the copying occurs during boot up.

16. The method of claim 15, further comprising, while copying the virtual-to-physical mapping table stored to the first non-volatile memory array to a volatile memory array and in response to a read request or write request, access the portion of the virtual-to-physical mapping table stored to the second non-volatile memory array.

17. The method of claim 15, further comprising:
selecting, by the controller and using an algorithm, entries from the virtual-to-physical mapping table to store to the second non-volatile memory array.

18. The method of claim 15, further comprising:
determining, by the controller, that the virtual-to-physical mapping table is not accessible in a volatile memory array;
determining, by the controller, that an entry is located in the portion of the virtual-to-physical mapping table stored to the second non-volatile memory array; and
reading, by the controller, the entry from the portion of the virtual-to-physical mapping table stored to the second non-volatile memory array.

19. The method of claim 15,
wherein the first non-volatile memory array comprises a flash memory array, and
wherein the second non-volatile memory array comprises one of a magneto resistive random-access memory array or a phase-change memory array.

20. A computer-readable storage device comprising instructions that, when executed, configure one or more processors of the storage device to:
store information including a virtual-to-physical mapping table to a volatile memory configured to store data from the storage device;
store a virtual-to-physical mapping table to a first non-volatile memory array configured to store data from a host device and the storage device;
store a portion of the virtual-to-physical mapping table to a second non-volatile memory array configured to store data from the storage device, wherein the second non-volatile memory array is separate from the first non-volatile memory array; and
perform a wear leveling and a garbage collection operation;
reposition data within the second non-volatile memory array based upon the wear leveling and garbage collection;
update the virtual-to-physical mapping table based upon the repositioned data within the second non-volatile memory array;
process read and write commands using a portion of the virtual-to-physical mapping table during boot up, wherein the portion of the virtual-to-physical mapping table is less than all the virtual-to-physical mapping table, wherein the portion of the virtual-to-physical mapping table is stored in the second non-volatile memory array; and
copy the virtual-to-physical mapping table from the first non-volatile memory array to the volatile memory array, wherein in the copying occurs during boot up.

* * * * *